June 12, 1962 R. LAGIER 3,038,972
VEHICLE GROUND CONNECTOR
Filed Feb. 24, 1960 2 Sheets-Sheet 1

INVENTOR
Robert Lagier
By [signature]
ATTORNEYS

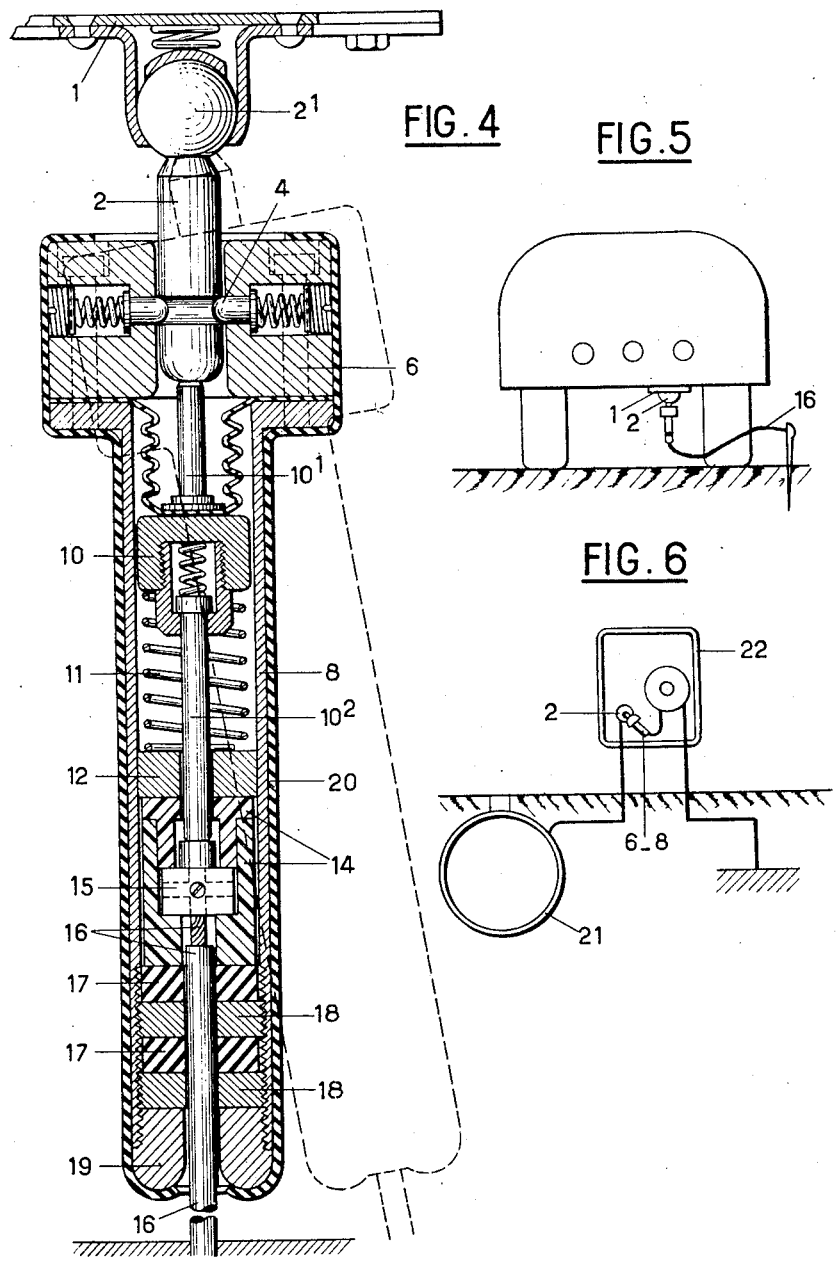

United States Patent Office 3,038,972
Patented June 12, 1962

3,038,972
VEHICLE GROUND CONNECTOR
Robert Lagier, Montbrison, France, assignor to Societe Anonyme dite: l'Equipement Electrique et Antideflagrant, Paris, France, a corporation of France
Filed Feb. 24, 1960, Ser. No. 10,794
Claims priority, application France Feb. 26, 1959
1 Claim. (Cl. 200—51.09)

It is well known that certain metallic equipment tends to accumulate a static electrical charge, which may be quite high, from natural causes. This is true, for example, of all sorts of metallic tanks on both fixed and mobile equipment, and especially of fuel tanks on heavy vehicles, and other tanks with which certain vehicles are equipped.

This static charge results in a potential difference, which may be quite large, between the metallic body of the equipment and ambient objects. In this case, the least approach, whether accidental or otherwise, with a body having a different potential, produces a spark which may ignite gasoline vapor or other inflammable products. To avoid these dangerous consequences various official regulations prescribe certain precautions requiring the grounding of such equipment before any other step is taken.

For this purpose, devices have been placed in service which are carried by the end of a grounding cable and which are adapted to be fixed to a metallic part of the equipment. These devices comprise a switch used to complete a contact with the end of the grounding cable, and enclosed in a sealed box. One disadvantage of these devices is that they do not insure safety as completely as necessary, since before the grounding contact is made, the device has an irregular and poorly established contact with the metallic body to be grounded. This results from the fact that the means for assembling these devices is usually of the screw-clamp type, which is not overly convenient and takes some time to connect up.

The operator may easily, when handling this device and its attaching means, produce a grounding contact with a resulting spark which may flash outside the box and cause an accident. Moreover, as a result of the foregoing, the mounting and assembly of these devices are rather inconvenient, and one may easily lose them if he forgets to remove them (in the case of vehicles) since the attaching means may come apart.

The safety device according to the present invention avoids these disadvantages, particularly because it insures a convenient logical connection for the ground, while perfectly insulating the operator and insuring a clean and accurate connection which completely eliminates mistakes and any risk that dangerous sparks may escape outside the box.

According to the invention, the fixed or mobile equipment, before being grounded is permanently equipped with a grounding terminal fixed thereto in any known manner (soldering, screws, or the like), while being also preferably mounted so that its angular position may be adjusted by means of a ball joint, for example, the aforesaid terminal being in the form of a rod or plug mounted to cooperate with a hollow socket, the head of which is formed in a corresponding and complementary manner to insure an instantaneous, resilient, exact and firm connection, when the two elements are brought into engagement with each other, the said terminal or conductive plug pressing at the time of contact against the resilient means a piston rod which contacts, in a carefully insulated chamber, the fixed terminal at one end of the grounding cable, the said socket and its head being completely enclosed within an insulating casing which is preferably flexible and removable.

To illustrate the invention, without limiting its scope to the details thereof, one embodiment thereof will now be described, in connection with the accompanying drawings, in which.

Figure 1:
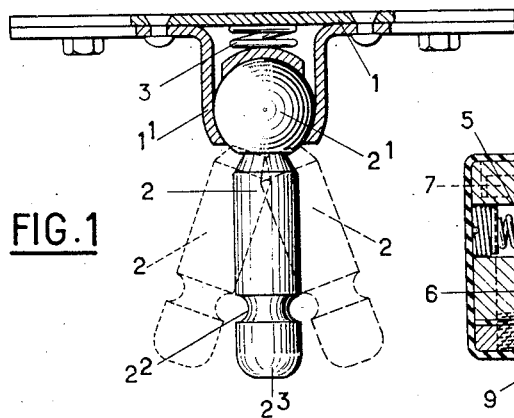
FIG. 1 is a cross-sectional view of the terminal or plug permanently mounted on the equipment which is to be grounded. The broken lines indicate various positions of the plug which facilitate its manipulation and the mounting of the socket.
Figure 2:
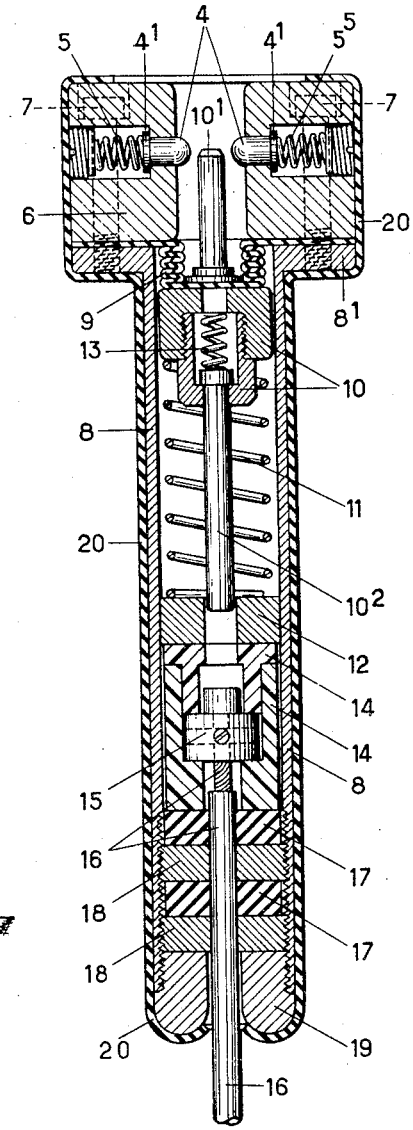
FIG. 2 is an axial cross-section of an assembly of one illustrative embodiment of the socket.
Figure 3:
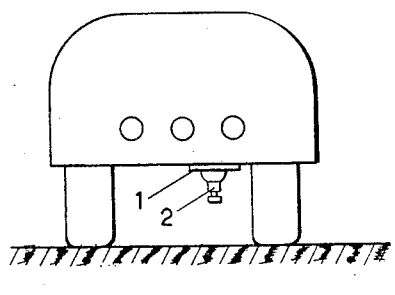

FIG. 3 schematically illustrates, purely by way of example, a mobile installation in a type of tank truck equipped with a grounding terminal of the type shown in FIG. 1, no connection to the ground having yet been made.

FIG. 4 is an assembly view, in axial cross-section showing the socket mounted on the grounding terminal of the equipment, in order to ground it. The broken lines show how the terminal and socket may be swung.

FIG. 5 is a schematic view similar to FIG. 3, showing the grounding of the mobile equipment.

FIG. 6 is a schematic view illustrating by way of example, a fixed installation embodying the invention.

The drawings show one illustrative form of the invention according to which a grounding terminal is fixed to the metallic body of the equipment to be protected. This terminal comprises an attaching plate or base 1, which is fixed to the equipment by means of screws, for example, or by soldering, or in any other way. This base is provided with a journal $1^1$ in which is seated the end $2^1$ of a conductive rod or plug 2, which is formed as a ball. The plug is so mounted that it may pivot to take a plurality of positions so as to facilitate connections thereto. The plug 2 is maintained in any one of these positions by the resilient force exerted by a spring 3 interposed between the ball and the base 1.

Near its free end the plug 2 is provided with a circular groove $2^2$ adapted to receive resiliently biased positioning pins 4 mounted for radial movement under pressure from the springs 5 in a connecting head 6. The free end $2^3$ of the plug 2 is rounded or conical to spread the pins 4 as connections are being made. The radial movement of the fingers 4 is limited by a collar $4^1$ which butts against a shoulder.

The head 6 is held by means of screws 7, or the like, against a collar $8^1$ at the end of a socket 8. A bellows 9, made of rubber or some other flexible insulating material, is interposed between the head 6 and the socket 8. The latter is hollow, with a generally tubular shape so as to receive the contacting means, while providing an enclosed chamber which isolates the spark and prevents it from discharging into adjacent areas.

The construction of the contacting means will now be briefly described. This specific construction is shown purely by way of example and it may be modified as to detail without thereby departing from the spirit of the invention. In the embodiment shown, it will be seen that a piston 10 is slidably mounted in the socket and is biased against the head 6 by means of a spring 11, which rests on a ring 12 fixed within the said socket. The piston 10 is fixed to a contact pin $10^1$ and insulated from the exterior of the socket by the bellows 9. The piston is also connected to the movable rod $10^2$ which is axially slidable with respect to the piston and biased by a spring 13.

The insulating elements 14, which may be made of plastic, for example, are mounted against the ring 12. A contact terminal 15 is positioned within these insulating elements and connected to the end of the grounding cable 16. Sealing rings 17 of rubber or any other suitable insulating material, held by the rings 18, which are screwed into the end of the socket, keep the socket sealed and support the elements 14. A hollow plug 19 is screwed into the end of the socket. The complete insulation of the interior of the socket is thus insured at its two ends by the bellows 9 and the sealing rings 17. It will be appreciated that when the head of the socket is mounted (FIG. 4) on the plug or pin 2, the piston, together with the movable rod is forced back by the penetration of the plug. The movable rod $10^2$ is thus forced back and into contact with the terminal 15. Any spark which may occur on completion of that contact is completely isolated within the socket and all danger is eliminated.

It should, moreover, be emphasized, that devices according to the invention actually assure absolute safety through permanent mounting of the plug 2, which to a certain extent polarizes the static current of the equipment, and also by reason of the engagement of the plug 2 with the head of the socket 8. This arrangement provides an immediate contact, full and exact, which permits the discharge to occur inside the socket, thus avoiding any possibility of an exterior spark.

These high safety devices are completed by sheathing the socket 8 and its head 6 in a covering 20 of rubber or some other flexible insulating material. With this arrangement, the user can never in any manner come into contact with the static charge so as to himself constitute the ground.

An equally useful feature of devices according to the invention resides in its convenience for the operator, who may proceed to ground his equipment instantly, simply by pressure, without groping or difficulty. Disconnection is equally easy. If disconnection is forgotten (in the case of mobile equipment) there is no risk of losing the relatively expensive device on route, since it comes loose in a normal manner from the plug 2, without any tearing or breaking, and remains in place.

Devices embodying the invention are of course equally applicable to mobile installations (such as the tank truck shown in FIGS. 3 and 5), and fixed installations (such as the reservoir 21, FIG. 6). In the latter case the equipment may be enclosed in a box 22, containing a connecting plug 2 connected to the reservoir, whereas the connecting socket 6—8 is connected to the ground.

For mobile installations the equipment may also be enclosed in a box in which it is transported and mounted.

The box may be provided with automatic unwinding means operated either by hand or by the grounding cable.

Furthermore, the grounding terminal may be adapted to constitute the female part of the assembly with the other element adapted to form the male part.

It follows that the invention is in no way limited to the specific details of the embodiments herein before described, but embraces instead all mechanical equivalents thereof.

What I claim is:

An electrical grounding device of the type comprising in combination an electrical plug consisting of a pivotally mounted cylindrical rod inhibited against movement by resiliently biasing friction means and a detachable connector, said connector comprising an externally insulated socket dimensioned to receive said plug, an insulated chamber in communication with said socket, a fixed conductive element within said chamber, and a movable conductive element slidably mounted within said connector and having one end lying within said socket, said movable conductive element being positioned to slide between a first position in which its other end is spaced from said fixed conductive element and a second position in which said other end is in contact with said fixed conductive element, said plug being dimensioned to drive said movable conductive member from said first to said second position when inserted in said socket, said grounding device being characterized by the fact that said plug is mounted on a movable device which is to be grounded and the fixed conductive element in said connector is permanently connected to an insulated grounding cable, said plug being peripherally recessed and said connector socket being provided with resiliently biased stop means positioned to engage in said recess and yieldingly retain said plug within said socket.

References Cited in the file of this patent

UNITED STATES PATENTS

| | | |
|---|---|---|
| 1,688,148 | Martin | Oct. 16, 1928 |
| 2,533,763 | Cacciotti | Dec. 12, 1950 |
| 2,911,607 | Booth | Nov. 3, 1959 |

FOREIGN PATENTS

| | | |
|---|---|---|
| 634,693 | Germany | Sept. 3, 1936 |
| 637,067 | Germany | Oct. 20, 1936 |
| 1,092,008 | France | Nov. 3, 1954 |